US010004120B1

(12) United States Patent
Bell et al.

(10) Patent No.: US 10,004,120 B1
(45) Date of Patent: Jun. 19, 2018

(54) TECHNIQUES FOR PROVIDING ENVIRONMENTAL LIGHTING USING NETWORK INFRASTRUCTURE

(71) Applicant: ABL IP Holding LLC, Decatur, GA (US)

(72) Inventors: Robert Bell, Erin (CA); Garrett Douglas, Calgary (CA); Kevin D. Loewen, Calgary (CA)

(73) Assignee: ABL IP Holding LLC, Atlanta, GA (US)

( * ) Notice: Subject to any disclaimer, the term of this patent is extended or adjusted under 35 U.S.C. 154(b) by 0 days. days.

(21) Appl. No.: 15/486,514

(22) Filed: Apr. 13, 2017

(51) Int. Cl.
*H05B 37/02* (2006.01)
*H05B 33/08* (2006.01)
*H04L 12/10* (2006.01)

(52) U.S. Cl.
CPC ......... *H05B 33/0842* (2013.01); *H04L 12/10* (2013.01); *H05B 33/0815* (2013.01)

(58) Field of Classification Search
CPC ............ H05B 33/0815; H05B 33/0818; H05B 41/2828; H05B 41/3921; H05B 41/3927; H05B 41/28; H05B 37/029; H05B 33/0803; H05B 37/0254; H05B 37/02
See application file for complete search history.

(56) References Cited

U.S. PATENT DOCUMENTS 9,894,735 B2 * 2/2018 Keith ................. H05B 37/0227
2013/0342131 A1 * 12/2013 Recker ............... H05B 33/0842
315/292

OTHER PUBLICATIONS

UL 924 , "Emergency Lighting and Power Equipment," Jul. 11, 2001, pp. 1-278.
Notice of Allowance for U.S. Appl. No. 15/486,541, dated Sep. 26, 2017 (11 pages).

* cited by examiner

*Primary Examiner* — Minh D A
(74) *Attorney, Agent, or Firm* — Kilpatrick Townsend & Stockton, LLP

(57) ABSTRACT

A network switch and luminaire provide environmental lighting via network infrastructure. The network switch operates in a communication mode that communicates, via a network interface, data with the luminaire over a network. Some portion of the data may be lighting control information for the luminaire that is produced by a control device. The network uses a network protocol that provides power to the luminaire using a network cable, where the luminaire uses the power to illuminate a lighting element. In response to a signal received by an emergency control input on the network switch, the emergency circuitry switches the network switch from the communication mode to an emergency lighting mode. The emergency lighting mode bypasses the processor used for communicating data via the network interface, and provides, via the network cable attached to the network interface, only power to the luminaire.

20 Claims, 5 Drawing Sheets

TECHNIQUES FOR PROVIDING ENVIRONMENTAL LIGHTING USING NETWORK INFRASTRUCTURE

BACKGROUND

Though various options exist for providing general environmental lighting, few solutions exist that also ensure adequate illumination for egress during emergency situations. The requirements for such emergency lighting are specified by various standards, such as UL924 standard entitled "Standard for Safety of Emergency Lighting and Power Equipment." Emergency lighting equipment is intended to automatically supply illumination, electrical power, or both to critical areas and equipment in the event of failure of the normal supply, in accordance with applicable standards, such as Article 700 or 701 of the National Electrical Code (National Fire Protection Association (NFPA) 70), the Life Safety Code (NFPA 101), the Fire Code (NFPA 1), the International Building Code (IBC), and the International Fire Code (IFC).

In a configuration using network infrastructure to provide power to luminaires for environmental lighting, such as Power-over-Ethernet (PoE), the network switch provides the power to a luminaire based on an on-going negotiation with the luminaire via the network. Thus, in order for the network switch to provide power to the luminaire, the network must remain operational in order for the negotiation to occur. Maintaining the network relies, in part, upon a processor and firmware executing in the network switch. However, certifying that network devices comply with emergency lighting standards, such as UL924, when such devices rely upon software components can be difficult. What is needed are network devices that can provide emergency lighting, but that do not rely upon software-driven components to provide this capability.

SUMMARY

Various aspects of the present invention relate to a network switch and luminaire that provide environmental lighting via network infrastructure. The network switch operates in a communication mode that communicates, via a network interface, data with the luminaire over a network. The network uses a network protocol that provides power to the luminaire using a network cable, and the luminaire uses the power to illuminate a lighting element. In response to a signal received by an emergency control input on the network switch, the emergency circuitry switches the network switch from the communication mode to an emergency lighting mode. The emergency lighting mode of the network switch bypasses the processor used for communicating data via the network interface, and provides, via the network cable attached to the network interface, only power to the luminaire.

In response to link detection circuitry in the luminaire determining that no data has been received from the network switch for a threshold time period, the link detection circuitry then switches the luminaire from communication mode to an emergency lighting mode. When in the emergency lighting mode, the link detection circuitry closes a relay that bypasses the driver circuitry for the lighting elements of the luminaire, and provides power that is received from the network interface directly to the lighting elements that are configured for emergency lighting.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Implementations of the present invention are generally directed to network devices that provide environmental lighting, including emergency lighting that provides illumination for egress during emergency situations. In various implementations, during normal operation (also referred to as "communication mode") a network switch communicates data with the luminaire over a network using a network cable. The network between the switch and the luminaire uses a network protocol, such as Power-over-Ethernet (PoE), that provides the luminaire with electrical power for illuminating a lighting element using driver circuitry to control the illumination.

When an emergency situation occurs, such as a fire alarm, the network switch receives an externally-generated signal indicating the emergency condition. In response to receiving the signal, emergency circuitry switches the network switch to an emergency lighting mode that terminates the network protocol used to establish the network with the luminaire. With the network disabled, the network switch provides only electrical power to the luminaire via the network cable. At the luminaire, a link detection relay detects that the network is no longer established, which causes the luminaire to switch into emergency lighting mode. Once the luminaire is in the emergency lighting mode, it closes the link detection relay thereby providing power from the network interface directly to the lighting element used for emergency lighting.

Figure 1:
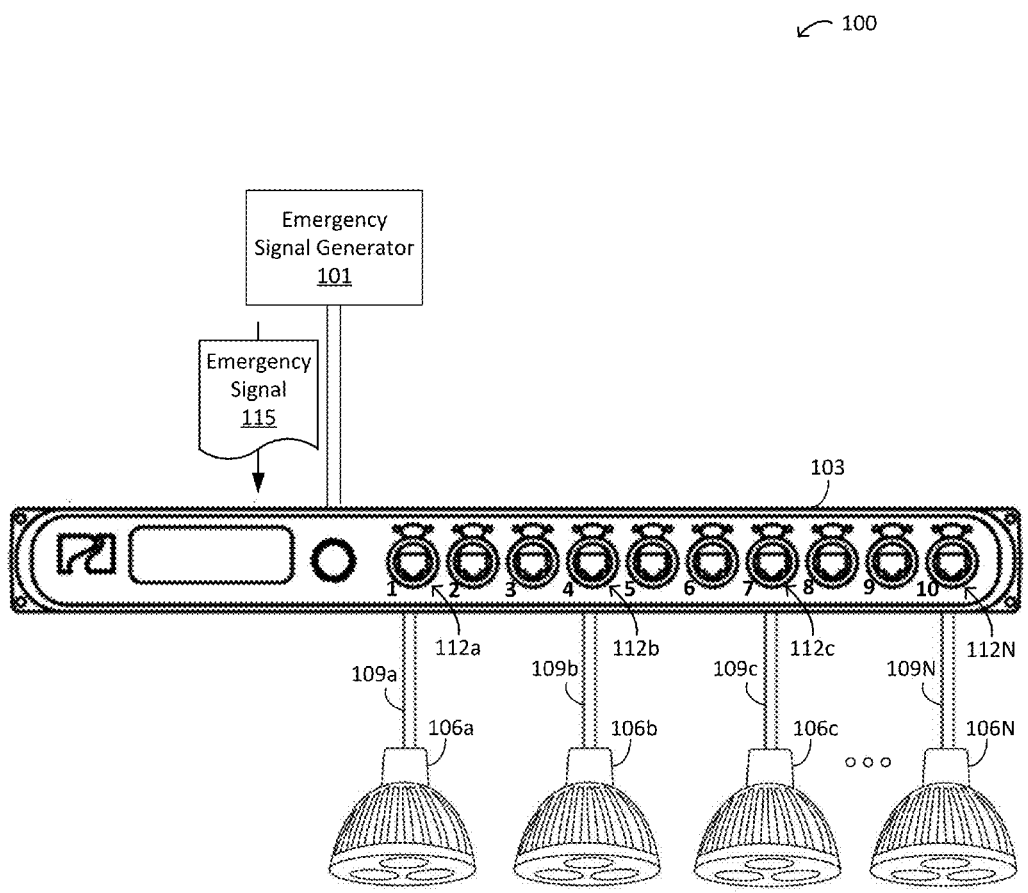
FIG. 1 is a drawing of a networked environment according to various implementations of the present disclosure.

With reference to FIG. 1, shown is an exemplary networked environment 100 illustrating the environmental lighting functionality disclosed herein. The networked environment 100 includes an emergency signal generator 101, a network switch 103 and various luminaires 106a . . . N. The luminaires 106 are in data communication with the network switch 103 via corresponding network cables 109a . . . N. The network cables 109 can include unshielded twisted pair (UTP) cables, shielded twisted pair (STP) cables, and/or other types of cable suitable for carrying data and electrical power, such as those defined by ANSI/TIA-568 and/or ISO/IEC 11801. For example, the network cables 109 can include Category 5 (Cat 5) specification cables as defined by ANSI/TIA-568.

The network switch 103 comprises a device with two or more network interfaces 112a . . . N with which a network is established with each of the one or more luminaires 106. The networks can be established using any communication network protocol that provides the ability to negotiate for and provide electrical power to network devices, such as the luminaires 106. For example, the networks may implement a network protocol from the family of Ethernet standards that support Power-over-Ethernet (PoE), such as IEEE 802.3af-2003, IEEE 802.3at-2009, and/or IEEE 802.3bt. Each of the luminaires 106 include one or more lighting elements, such as light-emitting diodes (LEDs) or fluorescent lamps, for providing environmental lighting in a room or other space.

The network switch 103 also includes an emergency control input with which it is communicatively coupled to the emergency signal generator 101. The emergency signal generator 101 is a monitoring device capable of generating a notifying signal in the event that an emergency situation (as may be defined) occurs in the facility where the luminaires 106 operate. For example, the emergency signal generator 101 may be a Fire Alarm Control Panel (FACP) component of a fire alarm system, whereby the FACP generates a signal when the fire alarm system for the facility detects a fire. In some implementations, an emergency signal is produced by a dry contact, Applied Transistor-Transistor Logic (TTL), a test switch, User Datagram Protocol (UDP) broadcast message, and/or other possible signaling techniques.

Next, a general description of the operation of the various components of the networked environment 100 is provided. To begin, the network switch 103 communicates with the luminaires 106a-N to establish a network via each network interface 112a-N. A feature of the network protocol used for each of the networks is the ability to provide electrical power to devices in the network, in addition to supporting data communications. Thus, while operating in this particular configuration with the network established (also referred to as "communications mode"), the network switch 103 is capable of providing power to each of the luminaires 106a-N as requested for illuminating the lighting elements. For example, using a PoE network protocol in conjunction with an application layer protocol, such as ANSI E1.31 Streaming ACN (collectively referred to as "ANSI E1.31 sACN over PoE"), the network switch 103 (in the "power source equipment (PSE)" role) carries out an on-going negotiation with luminaires 106a-N (in the "powered device (PD)" role) to determine the amount of power to supply to the luminaires 106. In some implementations, the network switch 103 may store a value for the amount of power negotiated for each luminaire and/or which network interfaces 112 are attached to devices requiring power. In various implementations, manual electric switches (not shown), such as DIP switches, jumper blocks, etc., may be used in the network switch 103 to manually configure and store (i) a value for the amount of power to be provided on individual network interfaces 112 and/or (ii) an indicator for whether individual network interfaces 112 are eligible to provide power. In further implementations, the network switch 103 also includes analog power limiting circuitry (not shown), such as fuses, that limits the amount of power that may be consumed by individual and/or groups of network interfaces 112. The amount of power requested by each luminaire 106a-N for a given time interval may depend upon various power consumption factors, such as the amount of light output needed from the respective luminaire. The light output from the luminaires 106a-N may depend upon one or more control devices, such as programmable lighting controllers, lighting consoles, dimmers, on/off switches, programmed configurations, sensors, other luminaires, etc. associated with each luminaire, whereby the control data (also referred to as "lighting control information") may be received directly by the luminaires 106a-N and/or may be received by the luminaires 106a-N via the network switch 103. In some instances, a luminaire 106 may provide lighting control information to other luminaires based on a control device associated with the luminaire 106 (e.g., an occupancy sensor for the luminaire). In other instances, a luminaire 106 may receive lighting control information originated from a second luminaire and forward the lighting control information to a third luminaire.

While operating in communication mode, the network switch 103 uses the network protocol to communicate with and provide electrical power to the luminaires 106a-N, which requires use of a processor in the network switch 103. When the emergency signal generator 101 detects an emergency situation, it generates an emergency signal 115 that is transmitted to the network switch 103. With reference to the exemplary functional block diagram shown in FIG. 2, the emergency signal is received by the emergency control input of the emergency circuitry 203 for the network switch 103. The emergency circuitry 203 is configured to perform the operations necessary to switch the network switch from communications mode into emergency lighting mode in response to receiving an emergency signal. To that end, the emergency circuitry 203 includes hardware logic components that sense when an emergency signal is received and respond by bypassing the processor 206 used to implement the network protocol used for the network with each of the luminaires, such as with the representative luminaire 106a. In the exemplary diagram of FIG. 2, the network protocol is from the IEEE 802.3 family of standards for data communication and power distribution that is implemented over the network cable 109a, such as a Cat 5 cable. The processor 206 may be bypassed by various possible operations, such as by holding the processor 206 in a reset state using a reset switch 209, electrically isolating the processor 206 from the network interfaces (not shown), such as the representative network interface 112a, and/or other possible operations.

In addition to bypassing the processor 206, the emergency circuitry 203 triggers a relay or other electrical switching component that applies power from the power supply (not shown) directly to the network interface 112a in order to transfer power to the luminaire 106a. The power supply for the network switch 103 may be incorporated as a part of the network switch, be external to the network switch providing power via a connected power cable, or other configurations as can be appreciated. For example, the power supply (either internal or external) may provide a 48 volt DC output that can be applied to the network interface 112a. In some implementations, the amount of power supplied to the individual network interfaces 112 during emergency lighting mode is preconfigured in the network switch 103. In other implementations, the amount of power supplied to the individual network interfaces 112 during emergency lighting mode is based on a stored value negotiated with the corresponding luminaire 106 while the network switch 103 is in communication mode. The negotiated value for the emergency lighting mode may be a value negotiated expressly for operating the luminaire 106 in emergency lighting mode, or the value used during the emergency lighting mode may be the most recent or highest value negotiated for operating the luminaire 106 in communication mode.

The network switch 103 applies power to specific pins of the network interface 112a in order to transfer power through the conductors of the network cable 109a. For example, in the configuration shown in FIG. 2 that uses PoE as a network protocol during communication mode, the electrical power may be applied to pins of the network interface 112a differently depending upon the PoE implementation. In particular, PoE standards (e.g., IEEE 802.3af/at/bt) specify an Alternative A implementation (shown) that applies positive voltage to data pins 1 and 2, while the negative is applied to pins 3 and 6. The Alternative B implementation (not shown) instead applies positive voltage to pins 4 and 5, and the negative to pins 7 and 8. Thus, when the emergency circuitry 203 switches the network switch 103 to emergency lighting mode, the same pins of the network interface 112a used to transfer power while in communications mode may still be used to transfer power when in emergency lighting mode in which no network protocol is used. However, in other implementations (not shown), different pins may be used to transfer electrical power in emergency lighting mode than are used during communication mode.

For the luminaire 106a that is connected to the network switch 103 via the network cable 109a, link detection circuitry 213 senses operation of the network protocol used to communicate with the network switch 103. While the network protocol used for the network is established with the network switch 103, the luminaire 106a is in communication mode. While in communication mode, the processor 216 manages the light output from the luminaire 106a and also communicates with the network switch 103 as needed, according to the network protocol, which may be used in conjunction with an application layer protocol (e.g., ANSI E1.31 sACN over PoE). The light output from the luminaire 106a is produced by one or more lighting elements 219, such as the LEDs shown in FIG. 2. The processor 216 of the luminaire 106a manages the light output via the driver circuitry 222, such as the LED driver shown, that controls the LED lighting elements 219. The light output from the luminaire 106a may depend upon one or more control devices (not shown), such as programmable lighting controllers, lighting consoles, dimmers, on/off switches, programmed configurations stored in memory, sensors, other luminaires, etc. The control data for the control devices may be received via input directly to the luminaire 106a (e.g., data from a physical input) and/or may be received by the luminaire 106a via the network switch 103.

Based upon the activities of the luminaire 106a, the processor 216 may use the network protocol to negotiate the amount of power to be supplied by the network switch 103 to the luminaire 106a via the network cable 109a and network interface 232. For example, if the network between the luminaire 106a and the network switch 103 implements PoE using the IEEE 802.3af network protocol, a preset maximum of 15.4 watts (W) may be provided by the network switch, whereas IEEE 802.3at specifies a preset maximum of 30 W that can be provided by the network switch (power available to luminaires or other PDs may be less). Other standards, including those currently under development such as IEEE 802.3bt, may alter these maximum power values. The amount of power requested by the luminaire 106a for a given time interval (up to the maximum amount) may depend upon various power consumption factors, such as the amount of light output needed, the controls being used, and/or other power consumption activities of the luminaire 106a.

In the event that an emergency situation occurs, an emergency signal causes the network switch 103 to enter its emergency lighting mode that, among other activities, bypasses the processor 206 used to maintain the network protocol with the luminaire 106a. In implementations that use PoE as the network protocol, bypassing the processor 206 may terminate transmission of Ethernet link pulses used as part of the physical layer auto-negotiation process of the network protocol. The loss of link pulses is detectable by the luminaire 106a and results in the loss of the "link" between the network switch 103 and the luminaire 106a. In some implementations, when an emergency signal is received, the network switch 103 also uses the network to send a message indicating the emergency situation to the luminaire 106a prior to bypassing the processor 206.

Once the processor 206 of the network switch 103 is bypassed, the link detection circuitry 213 senses, via the network interface 232, that the protocol used for the network with the network switch 103 is no longer in use (e.g., the link is lost). In implementations that use PoE as the network protocol, the sensing may occur through circuitry that detects Ethernet link pulses used as part of the physical layer auto-negotiation process, whereby the link pulses can be used to detect the presence of a connection to another Ethernet device, as can be appreciated. For example, the network may be declared disabled (i.e., the link is lost) if one or more link pulses have not been received for a threshold time period specified by the network protocol. As a result of the loss of the network protocol used for the network with the network switch 103, luminaire 106a also enters emergency lighting mode. In some implementations, the luminaire 106 may also enter the emergency lighting mode following receipt of a message, received from the network switch 103 via the network, that indicates the emergency situation. Such an emergency message may be detected in the luminaire 106a by the link detection circuitry 213 and/or by the processor 216 that may in turn signal the link detection circuitry 213 to indicate that an emergency situation exists.

Figure 2:
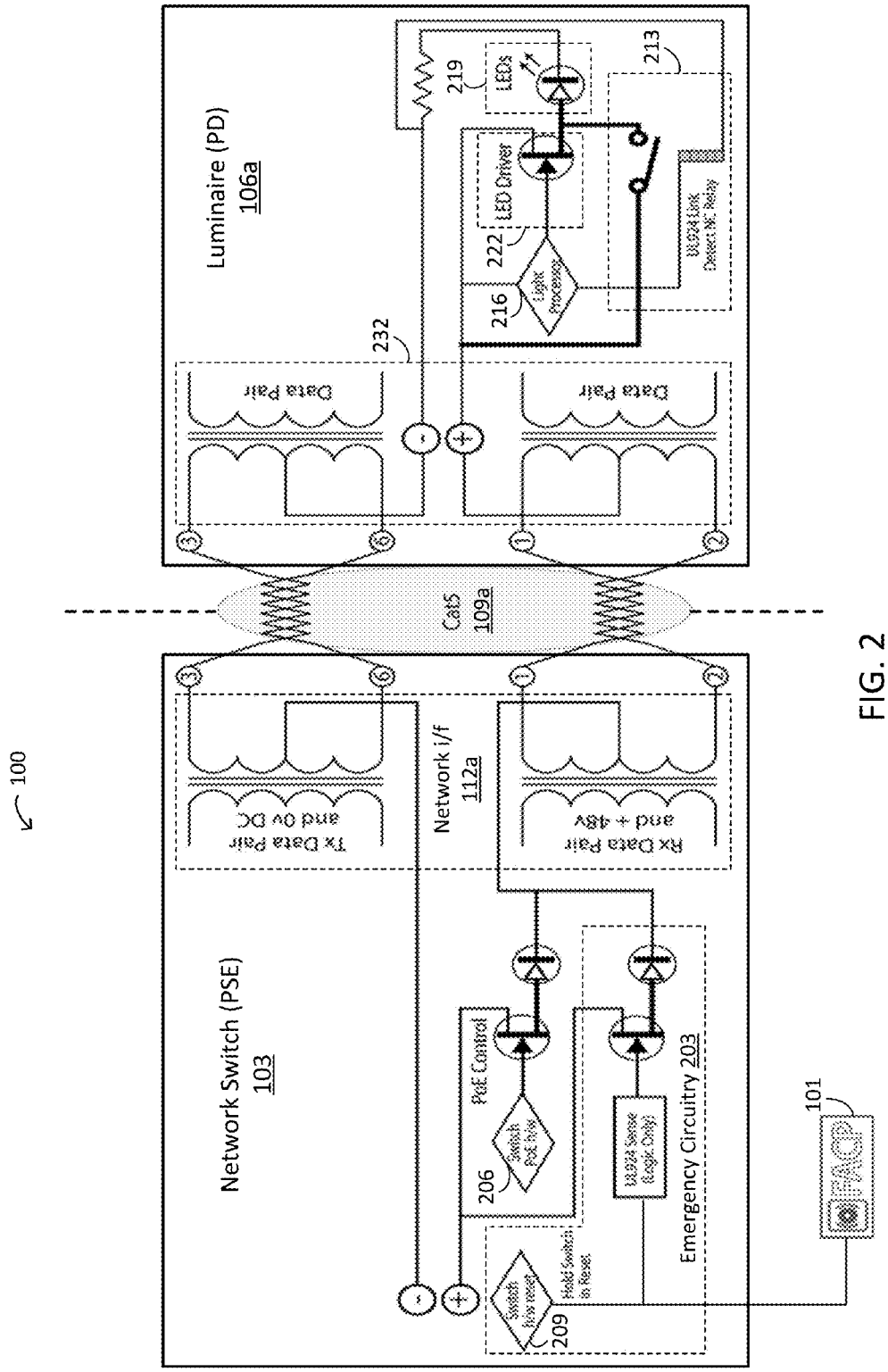
FIG. 2 is a functional block diagram of a networked environment according to various implementations of the present disclosure.

In emergency lighting mode, the link detection circuitry 213 of the luminaire 106a closes a relay or other similar electrical switching component that forms a closed circuit with the lighting elements 219 and specific conductors of the network cable 109a via the network interface 232 (also referred to as a "bypass circuit"). Consequently, any electrical power provided by the network switch 103 to the network cable 109a will be applied to power the lighting elements 219 in the emergency lighting mode (also referred to as the "emergency lighting elements"). In some implementations, the lighting elements used during emergency lighting mode may be the same as or different from the lighting elements used during communication mode, which may affect the power needs of the luminaire 106a when operating in the different modes. In various implementations, the bypass circuit created by the link detection circuitry 213 also bypasses the driver circuitry 222 and possibly the processor 216, such as shown in FIG. 2. Thereafter, the luminaire 106a may continue to provide emergency lighting using the electrical power received from the network switch 103, at least while the communication network is non-functional.

Figure 3:
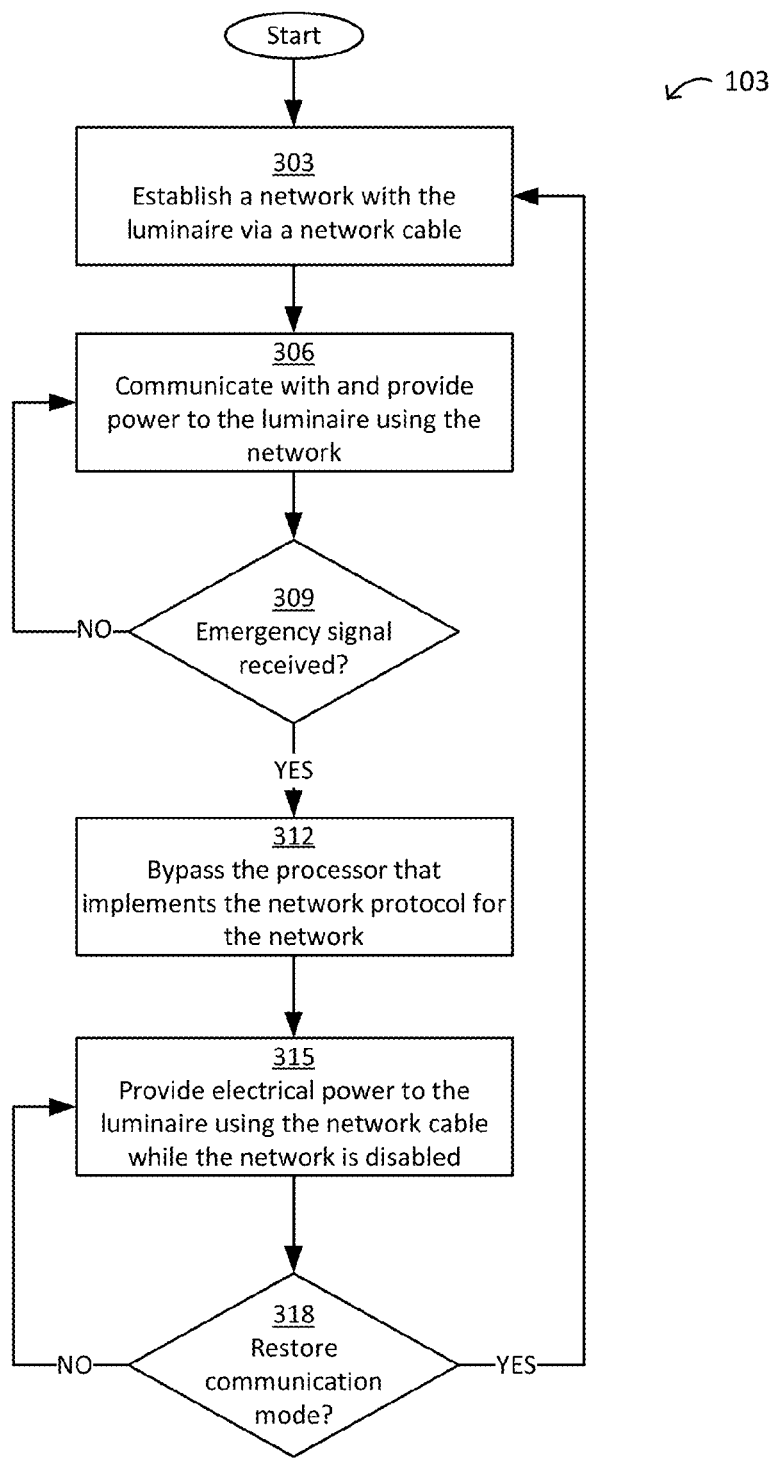
FIG. 3 is a flowchart illustrating one example of functionality implemented in a network switch in the networked environment of FIG. 1 according to various implementations of the present disclosure.

Referring next to FIG. 3, shown is a flowchart that provides one example of the operation of a portion of the network switch 103 that is configured to provide environmental lighting, including lighting for emergency situations. It is understood that the flowchart of FIG. 3 provides merely an example of the many different types of functional arrangements that may be employed to implement the operation of the network switch 103 as described herein. As an alternative, the flowchart of FIG. 3 may be viewed as depicting an example of elements of a method implemented in the network switch 103 according to one or more implementations.

The operations depicted in the flowchart of FIG. 3 may be initiated once the network switch 103 is connected to a luminaire 106 (FIG. 1) via a network cable 109 (FIG. 1). Beginning with block 303, the network switch 103 communicates with a luminaire 106 to establish a network, whereby a feature of the network protocol used for the network is the ability to provide electrical power to devices in the network, in addition to supporting data communications. For example, the network may be an Ethernet network that includes PoE from the IEEE 802.3 family of standards, but other types of networks offering both data communication and electrical power for devices are possible.

Next, in block 306, the network switch 103 communicates with and provides power to the luminaire 106 using the network established via the network cable. Thus, while operating in this particular configuration with the network established (i.e., "communication mode"), the network switch 103 provides the amount of power to the luminaire 106 that is requested, presuming the requested power is within limits specified by the network protocol and within the capability of the network switch 103. For example, using a PoE network protocol, the network switch 103 (in the PSE role) carries out an on-going negotiation with luminaire 106 (in the PD role) to determine the amount of power to supply to the luminaire 106. The amount of power requested by each luminaire 106a-N for a given time interval may depend upon various power consumption factors, such as the amount of light output needed from the respective luminaire. The network switches 103 uses its processor to carry out communication with the luminaire 106 using the network protocol, including the negotiation of power to be supplied via the network cable 109.

Then, in block 309, the network switch 103 uses its emergency circuitry to detect if an emergency signal has been received via its emergency control input. If no emergency signal is detected, the network switch remains in communication mode and returns to block 306. Alternatively, if an emergency signal was detected by the emergency circuitry, the emergency circuitry of the network switch 103 is configured to perform the operations necessary to switch the network switch from communications mode into emergency lighting mode, as described starting in block 312.

In block 312, the emergency circuitry of the network switch 103 bypasses the processor of the network switch that is used to implement the network protocol for the network with the luminaire 106. The processor may be bypassed by various possible operations, such as by holding the processor in a reset state using a reset switch, electrically isolating the processor from the network interfaces, and/or other possible operations.

Subsequently, in block 315, the emergency circuitry of the network switch 103 also triggers a relay or other electrical switching component that applies power from its power supply directly to specific pins of the network interface 112 (FIG. 1) in order to transfer power through the conductors of the network cable 109. As described above, when the emergency circuitry switches the network switch 103 to emergency lighting mode, the same pins of the network interface 112 used to transfer power while in communications mode may still be used to transfer power when in emergency lighting mode in which no network protocol is used (i.e., the network is disabled). However, in other implementations, different pins may be used to transfer electrical power in emergency lighting mode than are used during communication mode.

Next, in block 318, the network switch 103 determines if communication mode should be restored. Communication mode may be restored in the event that the emergency situation is resolved and the emergency signal that triggered the emergency mode is cleared. The emergency signal may be cleared by discontinuing the emergency signal for a time period, receiving a different signal indicating the emergency situation is resolved, or by another operation as may be defined for the particular type of emergency input. In the event that the emergency signal is not cleared, the network switch returns to block 315.

In the event that the emergency signal is cleared, the network switch 103 may return to block 303 and return to communication mode. In transitioning back to communication mode, the relay of the emergency circuitry opens to terminate the power being applied directly to the network interface 112 from the power supply, and the processor of the network switch 103 again manages the network protocol to communicate with and provide electrical power, if so configured, to the luminaire 106.

Figure 4:
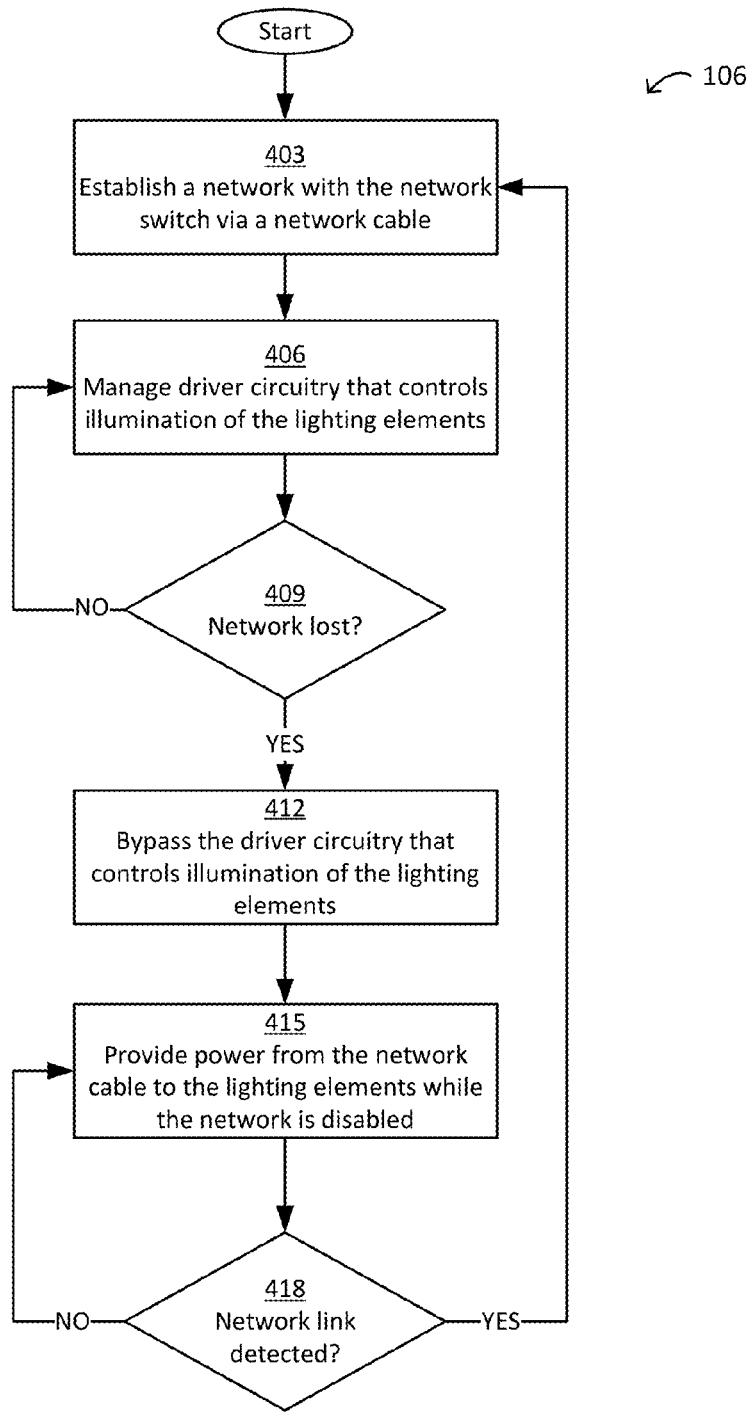
FIG. 4 is a flowchart illustrating one example of functionality implemented in a luminaire in the networked environment of FIG. 1 according to various implementations of the present disclosure

Referring next to FIG. 4, shown is a flowchart that provides one example of the operation of a portion of a luminaire 106 that is configured to provide environmental lighting, including lighting for emergency situations. It is understood that the flowchart of FIG. 4 provides merely an example of the many different types of functional arrangements that may be employed to implement the operation of the luminaire 106 as described herein. As an alternative, the flowchart of FIG. 4 may be viewed as depicting an example of elements of a method implemented in the luminaire 106 according to one or more implementations.

The operations depicted in the flowchart of FIG. 4 may be initiated once the luminaire 106 is connected to a network switch 103 (FIG. 1) via a network cable 109 (FIG. 1). Beginning with block 403, the luminaire 106 communicates with the network switch 103 to establish a network, whereby a feature of the network protocol used for the network is the ability to provide electrical power to devices in the network, in addition to supporting data communications. For example, the network may be an Ethernet network that includes PoE from the IEEE 802.3 family of standards using data communications, such as ANSI E1.31 sACN, at the application layer (collectively referred to as "ANSI E1.31 sACN over PoE"), but other types of networks offering both data communication and electrical power for devices are possible. Link detection circuitry in the luminaire 106 senses operation of the network protocol used to communicate with the network switch 103. In some implementations, the operation of the network is sensed at the physical layer (i.e., Layer 1 of the OSI model) by detecting link pulses, the absence of which may indicate that the network is disabled (the "link" is lost). While the network protocol used for the network is established with the network switch 103, the luminaire 106 is in communication mode.

While in communication mode, in block 406, the processor of the luminaire 106 manages the light output from the luminaire and also communicates with the network switch 103 as needed (e.g., using ANSI E1.31 sACN over PoE). In some implementations, the luminaire 106 may further receive control information from a control device via the network switch 103. The light output from the luminaire 106 is produced by one or more lighting elements, such as LEDs. The processor of the luminaire 106 manages the light output via driver circuitry, such as an LED driver that controls the LED lighting elements. Based upon the activities of the luminaire 106, the processor uses the network protocol to negotiate the amount of power to be supplied by the network switch 103 to the luminaire 106 via the network cable 109. The amount of power requested by the luminaire 106 for a given time interval (up to the maximum amount) may depend upon various power consumption factors, such as the amount of light output needed, the controls being used, and/or other power consumption activities of the luminaire 106.

In block 409, the link detection circuitry of the luminaire 106 determines, via the network interface 232 (FIG. 2) for the luminaire, if the protocol used for the network with the network switch 103 is no longer in use (i.e., the network is lost or disabled). In implementations that use the IEEE 802.3 family of standards for the network, the determination may occur through circuitry that detects Ethernet link pulses used as part of the physical layer auto-negotiation process, whereby the link pulses can be used to detect the presence of a connection to another Ethernet device, as can be appreciated. For example, the network may be declared disabled if one or more link pulses have not been received for a threshold time period specified by the network protocol. If the link detection circuitry of the luminaire 106 detects that the network protocol, such as the protocol for the physical layer (Layer 1), is still in use (i.e., the network is not lost), the luminaire returns to block 406. Alternatively, if the link detection circuitry of the luminaire 106 detects that the network protocol, such as for the physical layer protocol, is no longer in use on the network interface 232 (i.e., the network has been lost or disabled), the luminaire 106 proceeds to block 412 and enters emergency lighting mode.

In block 412, the link detection circuitry 213 of the luminaire 106a bypasses the driver circuitry of the luminaire 106 by closing a relay or other similar electrical switching component that forms a bypass circuit with the lighting elements and specific conductors of the network cable 109 via the network interface 232.

Consequently, in block 415, the electrical power provided by the network switch 103 to the network cable 109 will be applied to power the lighting elements in the emergency lighting mode, while the network is disabled. In some implementations, the lighting elements used during emergency lighting mode may be the same as or different from the lighting elements used during communication mode.

Next, in block 418, the link detection circuitry of the luminaire 106 determines, via the network interface 232 for the luminaire, if the protocol used for the network with the network switch 103 has been restored. If the link detection circuitry of the luminaire 106 determines that the network protocol is not present on the network interface 232, the luminaire 106 returns to block 415 where it may continue to provide emergency lighting using the electrical power received from the network switch 103 while the communication network is non-functional. Alternatively, if the link detection circuitry determines that the network protocol has been restored to the network interface 232 (i.e., an indication that the emergency situation has cleared), the luminaire returns to block 403 and transitions from emergency mode back to communication mode. As part of the transition, the link detection circuitry again opens the relay that created the closed circuit between the lighting elements and the conductors of the network cable 109 via the network interface 232.

Figure 5:
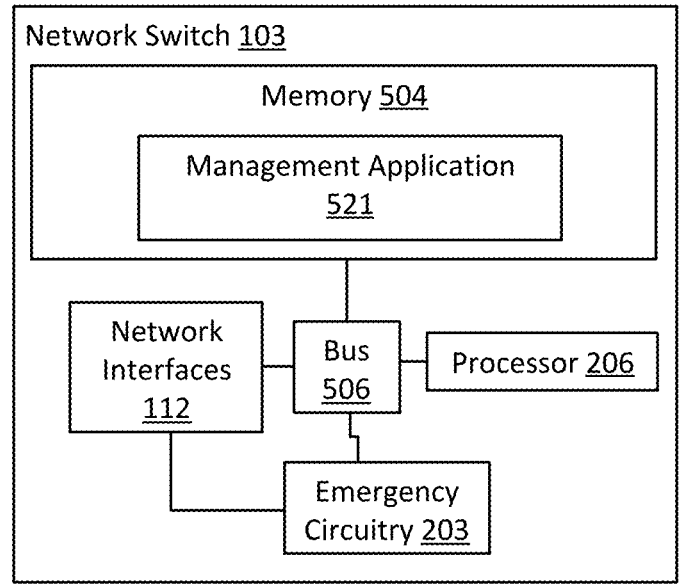
FIG. 5 is a schematic block diagram that provides one example illustration of a network switch employed in the networked environment of FIG. 1 according to various implementations of the present disclosure.

Next, in FIG. 5, shown is a block diagram depicting an example of a network switch 103 used for implementing the techniques disclosed herein within a networked environment 100. The network switch 103 can include a processing device 206. Non-limiting examples of the processing device 206 include a microprocessor, an application-specific integrated circuit ("ASIC"), a state machine, or other suitable processing device. The processing device 206 can include any number of processing devices, including one. The processing device 206 can be communicatively coupled to computer-readable media, such as memory device 504. The processing device 206 can execute computer-executable program instructions and/or access information respectively stored in the memory device 504.

The memory device 504 can store data and instructions that, when executed by the processing device 206, cause the processing device 206 to perform some or all of the operations described herein. For example, the memory device 504 may include a management application 521 comprising instructions and data that cause the network switch 103 to perform communication mode functionality. The memory device 504 may be a non-transitory computer-readable medium, such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, and the like.

The network switch 103 can include a bus 506 that can communicatively couple one or more components of the corresponding device. Although the processor 206, the memory 504, and the bus 506 are depicted in FIG. 5 as separate components in communication with one another, other implementations are possible. For example, the processor 206, the memory 504, and the bus 506 can be components of printed circuit boards or other suitable devices that can be disposed in a network switch 103 to store and execute programming code.

The network switch 103 also includes network interfaces 112 and emergency circuitry 203. The network interfaces 112 can include transceiving devices configured for communication using one or more network protocols capable of providing data communication and electric power distribution. As a non-limiting example, the network interfaces 112 can include 1000BASE-T interfaces that comply with the IEEE 802.3at standard. The emergency circuitry 203 includes hardware logic components that sense when an emergency signal is received and respond by (i) bypassing the processor 206 and (ii) engaging a relay or other electrical switching component that applies power from a power supply directly to specific pins of the network interfaces 112.

Figure 6:
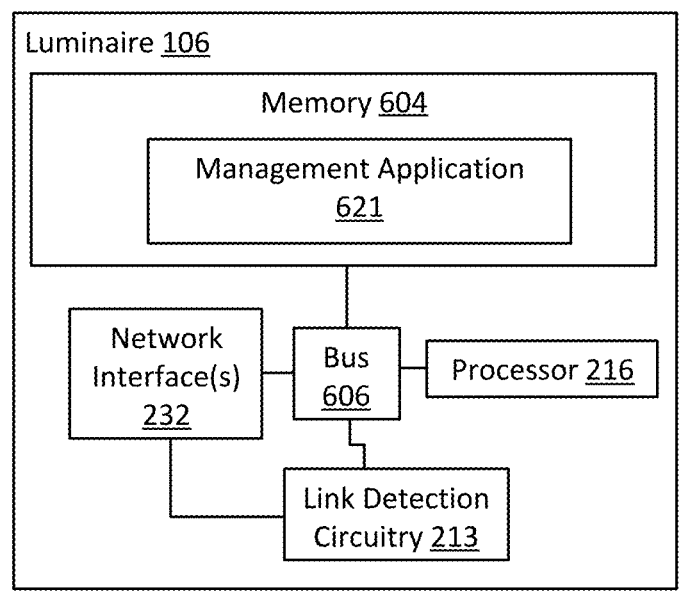
FIG. 6 is a schematic block diagram that provides one example illustration of a luminaire employed in the networked environment of FIG. 1 according to various implementations of the present disclosure.

In FIG. 6, shown is a block diagram depicting an example of a luminaire 106 used for implementing the techniques disclosed herein within a networked environment 100. The luminaire 106 can include a processing device 216. Non-limiting examples of the processing device 216 include a microprocessor, an ASIC, a state machine, or other suitable processing device. The processing device 216 can include any number of processing devices, including one. The processing device 216 can be communicatively coupled to computer-readable media, such as memory device 604. The processing device 216 can execute computer-executable program instructions and/or access information respectively stored in the memory device 604.

The memory device 604 can store data and instructions that, when executed by the processing device 216, cause the processing device 216 to perform some or all of the operations described herein. For example, the memory device 604 may include a management application 621 comprising instructions and data that cause the luminaire 106 to perform communication mode functionality. The memory device 604 may be a non-transitory computer-readable medium, such as (but not limited to) an electronic, optical, magnetic, or other storage device capable of providing a processor with computer-readable instructions. Non-limiting examples of such optical, magnetic, or other storage devices include read-only ("ROM") device(s), random-access memory ("RAM") device(s), magnetic disk(s), magnetic tape(s) or other magnetic storage, memory chip(s), an ASIC, configured processor(s), optical storage device(s), or any other medium from which a computer processor can read instructions. The instructions may comprise processor-specific instructions generated by a compiler and/or an interpreter from code written in any suitable computer-programming language. Non-limiting examples of suitable computer-programming languages include C, C++, C#, Visual Basic, Java, Python, Perl, JavaScript, and the like.

The luminaire 106 can include a bus 606 that can communicatively couple one or more components of the corresponding device. Although the processor 216, the memory 604, and the bus 606 are depicted in FIG. 6 as separate components in communication with one another, other implementations are possible. For example, the processor 216, the memory 604, and the bus 606 can be components of printed circuit boards or other suitable devices that can be disposed in a luminaire 106 to store and execute programming code.

The luminaire 106 also includes one or more network interfaces 232 and link detection circuitry 213. The network interface(s) 232 can include one or more transceiving devices configured for communication using one or more network protocols capable of providing data communication and electric power distribution. As a non-limiting example, the network interface(s) 232 can include one or more 1000BASE-T interfaces that comply with the IEEE 802.3at standard. The link detection circuitry 213 includes hardware logic components that sense when the network protocol on the network interface 232 has become non-functional (i.e., the network link is lost) and respond by closing a relay or other similar electrical switching component in order to form a bypass circuit with the lighting elements of the luminaire and specific pins of the network interface 232.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is a self-consistent sequence of operations or similar processing leading to a desired result. In this context, operations or processing involves physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing device, such as a network device or a similar electronic computing device or devices, that manipulate or transform data represented as physical electronic or magnetic quantities within memories, registers, or other storage devices, transmission devices, or display devices of the computing platform.

The system or systems discussed herein are not limited to any particular hardware architecture or configuration. A computing device, such as the network switch 103 or luminaire 106, can include any suitable arrangement of components that provide a result conditioned on one or more function calls. Suitable computing devices include multipurpose microprocessor-based computer systems accessing stored software that programs or configures the computing system from a general-purpose computing apparatus to a specialized computing apparatus implementing one or more aspects of the present subject matter. Any suitable programming, scripting, or other type of language or combinations of languages may be used to implement the teachings contained herein in software to be used in programming or configuring a computing device.

Aspects of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific aspects thereof, it will be appreciated that those skilled in the art, upon attaining an understanding of the foregoing, may readily produce alterations to, variations of, and equivalents to such aspects. Accordingly, it should be understood that the present disclosure has been presented for purposes of example rather than limitation, and does not preclude inclusion of such Therefore, the following is claimed:

1. A luminaire, comprising:
a processor;
a network interface;
one or more lighting elements;
driver circuitry for controlling the one or more lighting elements;
link detection circuitry;
a memory configured by a management application executed by the processor of the luminaire, the management application causing the luminaire to:
   operate in a communication mode comprising:
      communicating, via the network interface, data with a network switch over a network, wherein the network uses a network protocol that provides power to the luminaire using a network cable; and
      managing the driver circuitry to control illumination of the one or more lighting elements; and
   in response to the link detection circuitry determining that no data has been received from the network switch for a threshold time period, the link detection circuitry switches the luminaire from said communication mode to an emergency lighting mode causing the luminaire to:
   operate in the emergency lighting mode comprising:
      providing power that is received from the network interface directly to the one or more lighting elements while the power bypasses the driver circuitry.

2. The luminaire of claim 1, wherein the one or more lighting elements are one or more Light-Emitting Diodes (LEDs), and the driver circuitry is an LED driver.

3. The luminaire of claim 1, wherein communicating data with the network switch further comprises negotiating an amount of power needed by the luminaire.

4. The luminaire of claim 3, wherein negotiating the amount of power is conducted using the network protocol that is defined by the IEEE 802.3 family of standards.

5. The luminaire of claim 4, wherein the link detection circuitry determining that no data has been received from the network switch for the threshold time period comprises determining that link pulses have not been received according to the network protocol.

6. The luminaire of claim 1, wherein the network cable conforms at least to the Category 5 (Cat 5) specification defined by ANSI/TIA-568.

7. The luminaire of claim 1, further comprising:
while in the emergency lighting mode, in response to the link detection circuitry determining that data is being received from the network switch via the network interface, switching the luminaire from the emergency lighting mode to the communication mode, wherein the communication mode restores power to the driver circuitry for controlling the one or more lighting elements.

8. A method for a luminaire to provide lighting via network infrastructure, comprising:
operating the luminaire in a communication mode comprising:
   communicating, via a network interface, data with a network switch over a network, wherein the network uses a network protocol that provides power to the luminaire using a network cable; and
   managing driver circuitry that controls illumination of one or more lighting elements; and
in response to link detection circuitry determining that no data has been received from the network switch for a threshold time period, the link detection circuitry switches the luminaire from operating in the communication mode to operating in an emergency lighting mode; and
operating the luminaire in the emergency lighting mode comprising:
   bypassing the driver circuitry that controls the illumination of the one or more lighting elements; and
   providing power that is received from the network interface directly to the one or more lighting elements that are configured for emergency lighting.

9. The method of claim 8, wherein the one or more lighting elements are one or more Light-Emitting Diodes (LEDs), and the driver circuitry is an LED driver, and wherein operating the luminaire in the communication mode comprises powering a first plurality of LEDs and operating the luminaire in the emergency lighting mode comprises powering a second plurality of LEDs, wherein the second plurality of LEDs is more than the first plurality of LEDs.

10. The method of claim 8, wherein communicating data with the network switch further comprises negotiating an amount of power needed by the luminaire according to the IEEE 802.3 family of standards.

11. The method of claim 10, wherein the link detection circuitry determining that no data has been received from the network switch for the threshold time period comprises determining that link pulses have not been received according to the network protocol.

12. The method of claim 10, wherein a maximum amount of power negotiated depends upon the network protocol and is selected from a plurality of possible presets comprising a maximum of: 15.4 Watts (W) and 30 W.

13. The method of claim 8, wherein operating the luminaire in the emergency lighting mode further comprises bypassing a processor used by the luminaire during the communication mode.

14. The method of claim 8, wherein a first set of inputs on the network interface provide power during the communication mode and a second set of inputs provide power during the emergency lighting mode, and wherein providing power that is received from the network interface directly to the one or more lighting elements, comprises connecting the second set of inputs to the one or more lighting elements.

15. The method of claim 8, while in the emergency lighting mode, in response to the link detection circuitry determining that data is being received from the network switch, switching the luminaire from operating in the emergency lighting mode to operating in the communication mode, wherein operating the luminaire in the communication mode comprises using the driver circuitry to control illumination of the one or more lighting elements.

16. A luminaire, comprising:
a processor;
a network interface;
one or more lighting elements;
driver circuitry for the one or more lighting elements;
link detection circuitry;
a memory configured by a management application executed by the processor of the luminaire, the management application causing the luminaire to:
   operate in a communication mode comprising:
      communicating, via the network interface, data with a network switch over a network, wherein the network uses a network protocol that provides power to the luminaire using a network cable, the data including lighting control information produced for the luminaire by a control device; and managing the driver circuitry that controls illumination of the one or more lighting elements; and in response to receiving a message from the network switch that indicates an emergency situation, the link detection circuitry switches the luminaire from said communication mode to an emergency lighting mode causing the luminaire to:

operate in the emergency lighting mode comprising:
bypassing the driver circuitry that controls the illumination of the one or more lighting elements; and
providing power that is received from the network interface directly to the one or more lighting elements that are configured for emergency lighting.

17. The luminaire of claim 16, wherein the one or more lighting elements are one or more Light-Emitting Diodes (LEDs), and the driver circuitry is an LED driver.

18. The luminaire of claim 16, wherein communicating data with the network switch further comprises negotiating an amount of power needed by the luminaire.

19. The luminaire of claim 16, wherein the control device communicates with the luminaire via the network switch to control illumination of the one or more lighting elements, wherein the control device is a programmable lighting controller, a lighting console, a dimmer, a switch, a sensor, or other luminaire.

20. The luminaire of claim 16, wherein the link detection circuitry is also configured to switch the luminaire to the emergency lighting mode when no data has been received from the network switch for a threshold time period.

* * * * *